US010663759B2

(12) United States Patent
Vollet

(10) Patent No.: US 10,663,759 B2
(45) Date of Patent: May 26, 2020

(54) EAR-ENGAGING AND EYE-COVERING HEAD ASSEMBLY

(71) Applicant: Gregg Vollet, Mount Currie (CA)

(72) Inventor: Gregg Vollet, Mount Currie (CA)

(\*) Notice: Subject to any disclaimer, the term of this patent is extended or adjusted under 35 U.S.C. 154(b) by 0 days.

(21) Appl. No.: 13/716,432

(22) Filed: Dec. 17, 2012

(65) Prior Publication Data
US 2013/0278886 A1 Oct. 24, 2013

Related U.S. Application Data

(60) Provisional application No. 61/637,373, filed on Apr. 24, 2012.

(30) Foreign Application Priority Data

Dec. 14, 2012 (CA) ...................................... 2798596

(51) Int. Cl.
*G02C 5/14* (2006.01)
*G02C 3/02* (2006.01)
(52) U.S. Cl.
CPC ............... *G02C 5/143* (2013.01); *G02C 3/02* (2013.01)
(58) Field of Classification Search
CPC .......... G02C 5/143; G02C 3/02; G02C 3/006; A42B 1/24; A42B 1/247; A42B 3/16; A42B 3/166; A42B 3/18; A42B 3/185; H04R 5/033; H04R 5/0335; H04R 1/1083
USPC ...... 351/158, 155, 119, 118, 140; 2/6.3, 6.5, 2/6.7, 15, 10, 12, 13, 209, 209.14, 452, 2/453, 454, 421–424, 431
See application file for complete search history.

(56) References Cited

U.S. PATENT DOCUMENTS

| 1,216,635 | A | | 2/1917 | Washington |
| 3,798,712 | A | | 3/1974 | Sonic |
| 4,089,512 | A | | 1/1978 | Patmaer |
| 4,856,089 | A | | 8/1989 | Horton |
| 4,953,695 | A | * | 9/1990 | Tallman ................. A45C 11/04 206/5 |
| 5,046,192 | A | * | 9/1991 | Ryder ................................ 2/12 |
| 5,105,475 | A | | 4/1992 | Lynd et al. |
| 5,133,596 | A | | 7/1992 | Korny et al. |
| 5,278,999 | A | | 1/1994 | Brown et al. |
| 5,634,201 | A | * | 5/1997 | Mooring ................ A42B 1/245 2/12 |
| 5,724,119 | A | | 3/1998 | Leight |
| 5,926,854 | A | | 7/1999 | Grilliot et al. |

(Continued)

OTHER PUBLICATIONS

Written Opinion of the International Search Authority Relating to PCT/CA2013/050300 to Vollet.

(Continued)

*Primary Examiner* — Cara E Rakowski
(74) *Attorney, Agent, or Firm* — Cameron IP

(57) ABSTRACT

The present invention relates to an ear-engaging and eye-covering head assembly. The assembly includes a pair of ear-engaging members. The assembly includes an arcuate member connecting the ear-engaging members together. The assembly includes an eye protector operatively connected to the arcuate member and pivotable relative to the arcuate member. The assembly includes a protective cover connected to the arcuate member and shaped to receive the eye protector when the eye-covering member is pivoted upwardly towards the protective cover.

21 Claims, 16 Drawing Sheets

(56) References Cited

U.S. PATENT DOCUMENTS

| | | | | |
|---|---|---|---|---|
| 6,052,823 | A * | 4/2000 | Wilks | A42B 1/247 |
| | | | | 2/12 |
| 6,481,846 | B1 * | 11/2002 | Mikysa | 351/158 |
| 6,511,177 | B1 | 1/2003 | Hall et al. | |
| 7,020,901 | B2 | 4/2006 | Brhel | |
| 7,020,903 | B2 | 4/2006 | Artzberger | |
| 8,096,652 | B1 * | 1/2012 | Carbone | 351/54 |
| 2007/0154029 | A1 * | 7/2007 | Werner | 381/72 |
| 2010/0095977 | A1 | 4/2010 | Schmitz et al. | |
| 2011/0113537 | A1 | 5/2011 | Pang | |
| 2011/0194029 | A1 * | 8/2011 | Herrmann et al. | 348/569 |
| 2011/0209273 | A1 | 9/2011 | Fountain et al. | |
| 2013/0047310 | A1 * | 2/2013 | Peebles | A61F 9/029 |
| | | | | 2/15 |

OTHER PUBLICATIONS

Wayback Machine archived website page of the U.S. Department of Labour from Oct. 3. 2011. And entitled "Eye Protection in the Workplace": http://web.archive.org/web/20111003231651/http://ehs.okstate.edu/training/oshaeye.htm

* cited by examiner though the application claims the benefit of provisional application No. 61/637,373 filed in the United States Patent and Trademark Office on Apr. 24, 2012, the disclosure of which is incorporated herein by reference and priority to which is claimed. This application further claims the benefit of Canadian Patent Application No. 2,798,596 filed in the Canadian Intellectual Property Office on Dec. 14, 2012, the disclosure of which is incorporated herein by reference and priority to which is claimed.

EAR-ENGAGING AND EYE-COVERING HEAD ASSEMBLY

CROSS REFERENCE TO RELATED APPLICATION

This application claims the benefit of provisional application No. 61/637,373 filed in the United States Patent and Trademark Office on Apr. 24, 2012, the disclosure of which is incorporated herein by reference and priority to which is claimed. This application further claims the benefit of Canadian Patent Application No. 2,798,596 filed in the Canadian Intellectual Property Office on Dec. 14, 2012, the disclosure of which is incorporated herein by reference and priority to which is claimed.

FIELD OF THE INVENTION

The present invention relates to a head assembly. In particular, the invention relates to an ear-engaging and eye-covering head assembly.

DESCRIPTION OF THE RELATED ART

It is known to combine earmuffs with eye protectors pivotally connected thereto. See, for example, U.S. Pat. No. 5,724,119 to Leight, United States Patent Publication No. 2011/0209273 to Fountain et al., U.S. Pat. No. 7,020,903 to Artzberger, U.S. Pat. No. 7,020,901 to Brhel, U.S. Pat. No. 6,511,177 to Hall et al. and U.S. Pat. No. 5,278,999 to Brown et al.

The above-described prior art provides eye protectors that may be damaged through scratching, by being stepped on, or by objects impacting the protectors when the head assemblies are not in use.

U.S. Pat. No. 5,105,475 to Lynd et al. discloses visor-type headgear that includes an eye-shield, a forehead section, and a detent mechanism for positioning the eye-shield within the forehead section.

The above headgear does not appear to provide a means for protecting a wearer's ears and appears to require a visor.

There is accordingly a need for an improved ear-engaging and eye-covering head assembly that is compact and robust and which may overcome the above disadvantages.

BRIEF SUMMARY OF INVENTION

The present invention provides an improved ear-engaging and eye-covering head assembly.

According to one aspect, there is accordingly provided an ear-engaging and eye-covering head assembly. The assembly includes a pair of ear-engaging members. The assembly includes an arcuate member connecting the ear-engaging members together. The assembly includes an eye protector operatively pivotably connected to the arcuate member. The assembly includes a protective cover connected to the arcuate member. The protective cover is configured to receive the eye protector when the eye protector is pivoted upwardly towards the protective cover.

According to another aspect, there is provided an ear-engaging and eye-covering head assembly. The assembly includes a pair of ear-engaging members. The assembly include an eye-covering member operatively connected to the ear-engaging members. The eye-covering member is pivotable relative to the ear-engaging members. The assembly includes a protective cover connected to the ear-engaging members. The protective cover is shaped to selectively receive the eye-covering member when the eye-covering member is pivoted towards the protective cover.

According to a further aspect, there is provided an eye-covering head assembly for connecting to a top of a headband. The headband extends over the top a wearer's head and connects together a pair of ear-engaging members. The assembly includes an arcuate-shaped protective cover operatively connectable to the top of the headband. The assembly includes an eye-covering member operatively pivotably connected to the protective cover. The protective cover is shaped to receive the eye-covering member when the eye-covering member is pivoted towards the cover.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1:
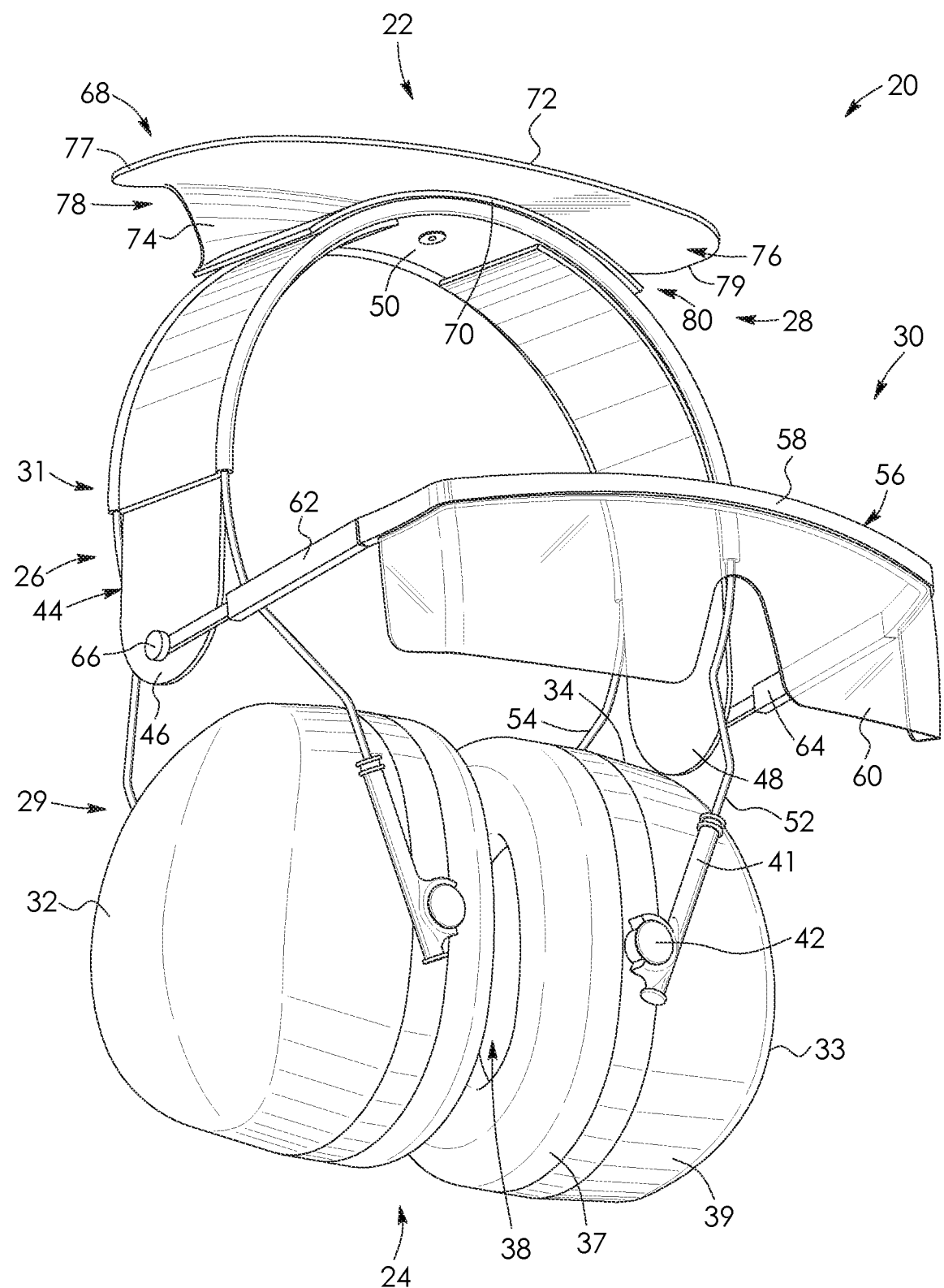
FIG. 1 is a side, front perspective view of an ear-engaging and eye-covering head assembly according to a first aspect, the assembly having a protective cover and having an eye protector in a first position.
Figure 3:
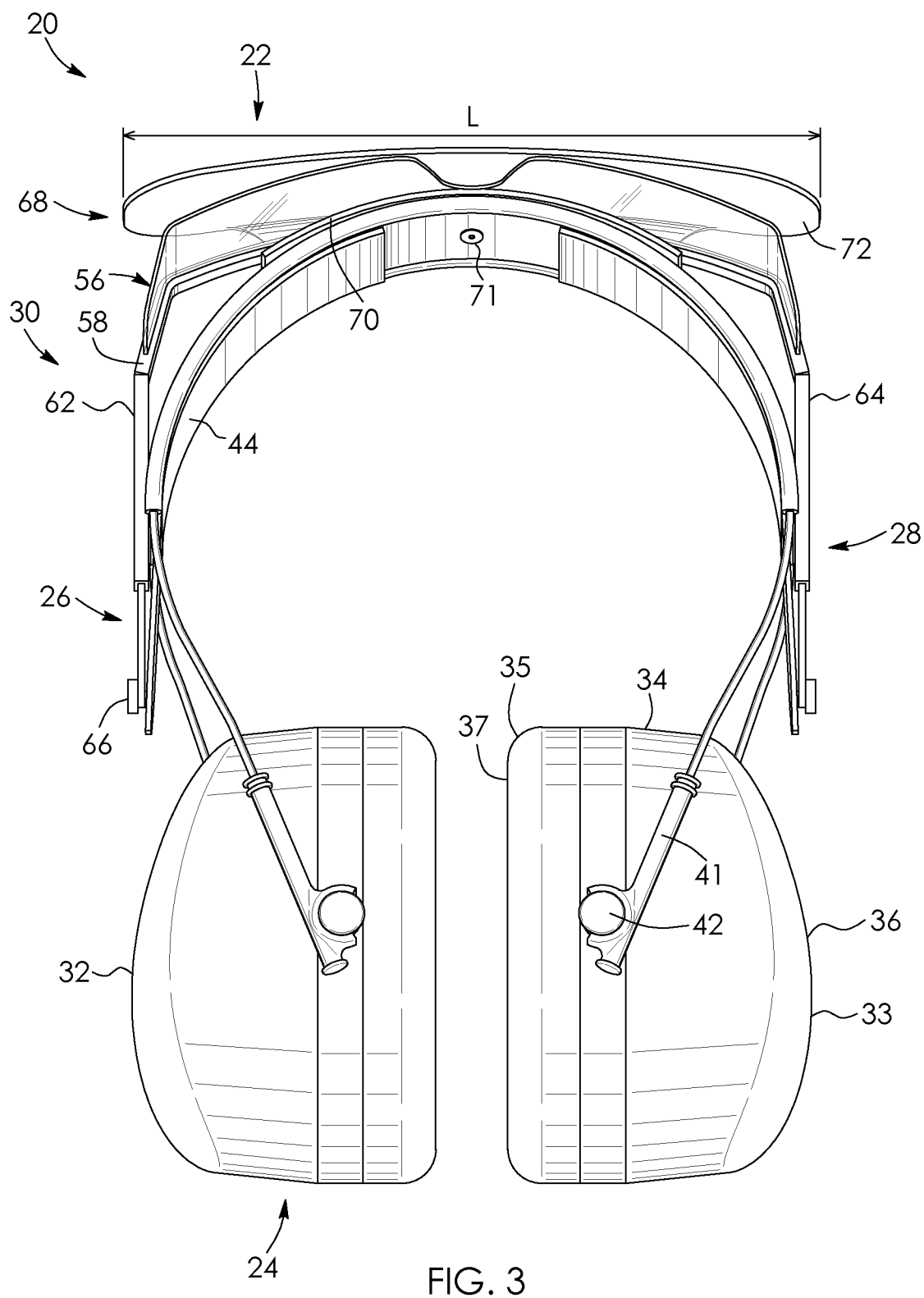
FIG. 3 is a front elevation view of the assembly shown in FIG. 1, the eye protector being positioned in a second position within the protective cover.
Figure 5:
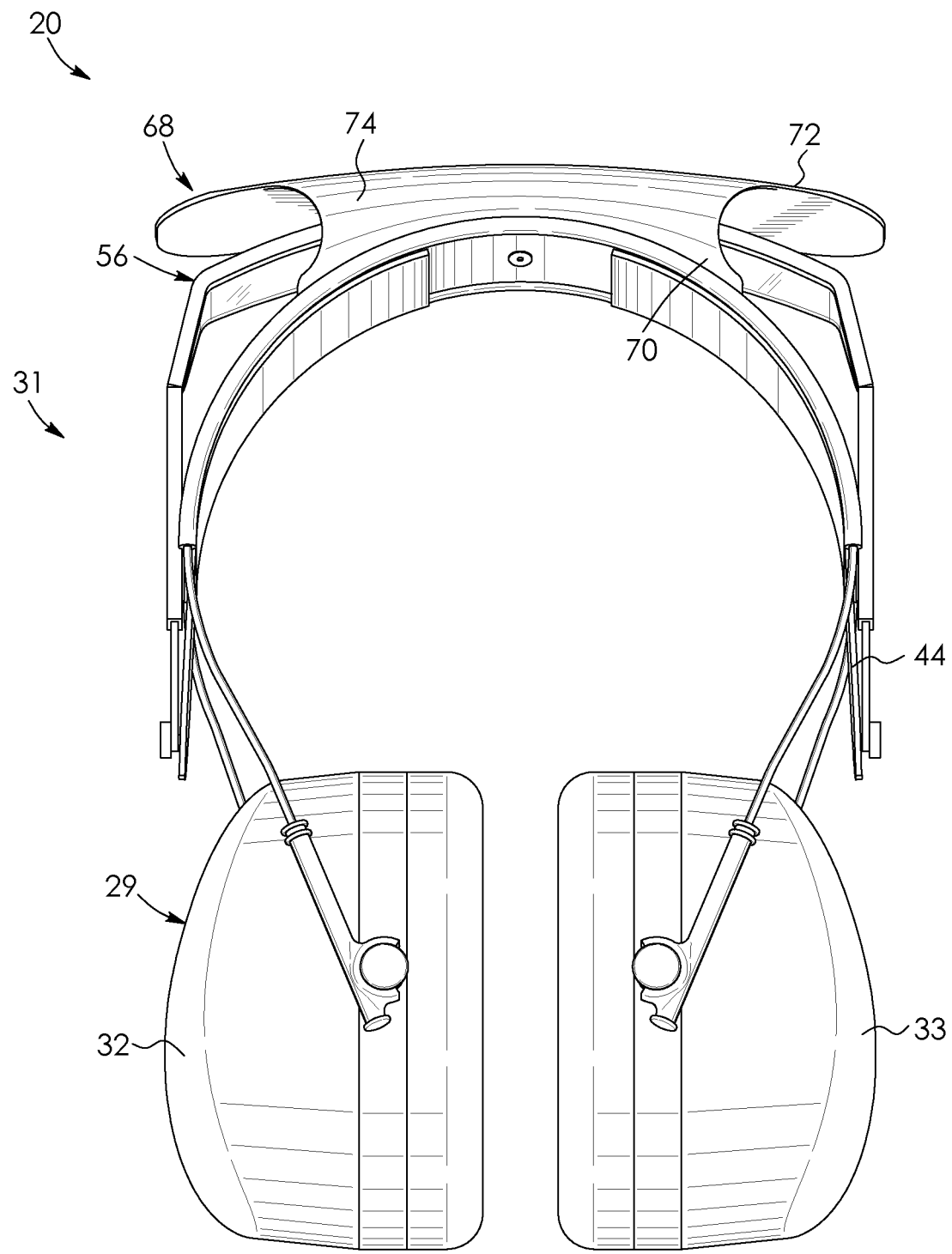
FIG. 5 is a rear elevation view of the assembly shown in FIG. 3.

Referring to the drawings and first to FIG. 1, there is shown an ear-engaging and eye-covering head assembly 20. The assembly has a top 22, a bottom 24 opposite the top, and a pair of spaced-apart sides 26 and 28 extending between the top and the bottom. The assembly 20 also includes a front 30 as best seen in FIG. 3 and a rear 31 opposite the front, as best seen in FIG. 5. Referring to FIG. 1, the front and rear of the assembly extend from top 22 of the assembly to bottom 24 of the assembly.

Figure 4:
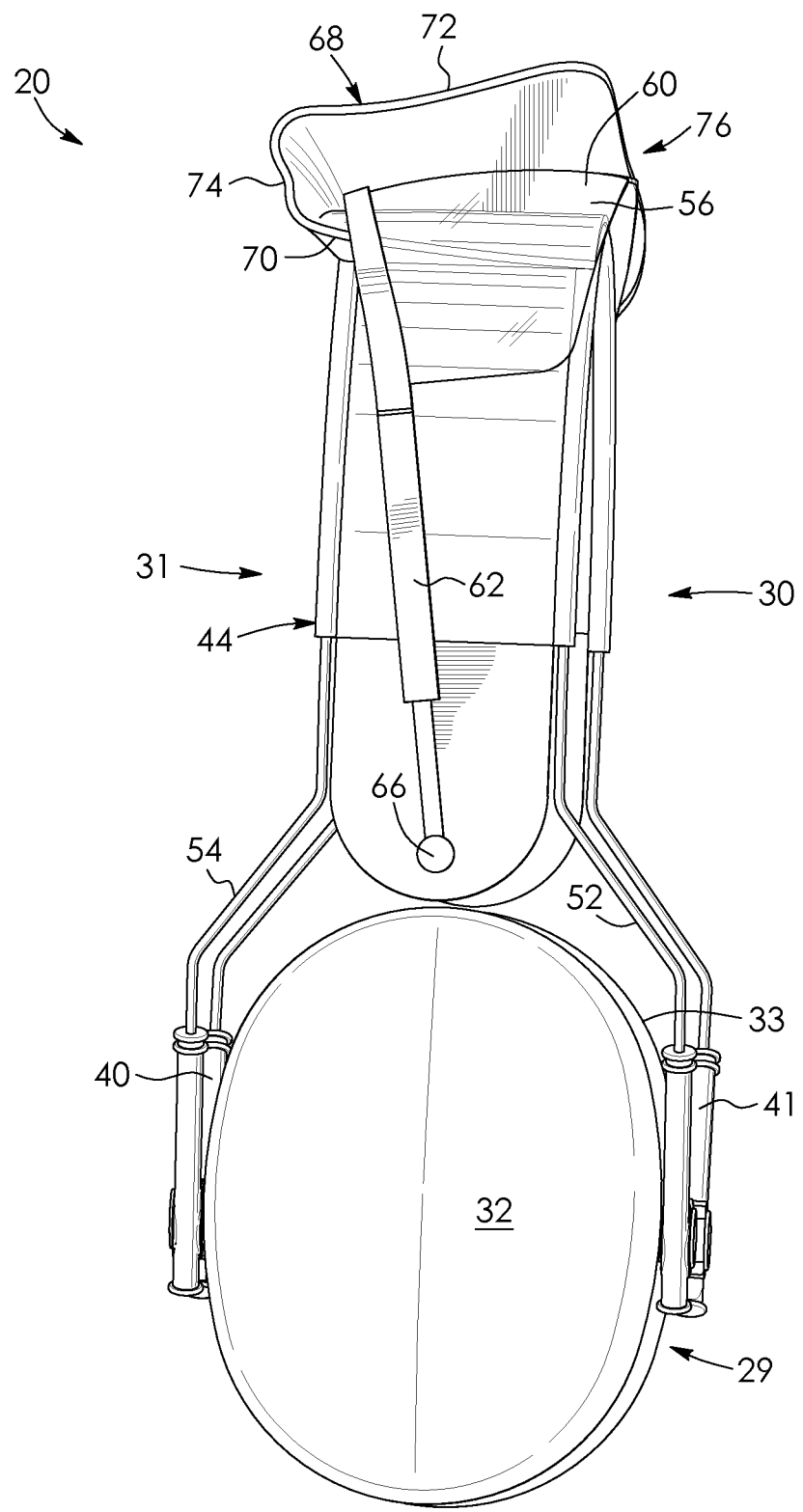
FIG. 4 is a side elevation view of the assembly shown in FIG. 3.

The assembly 20 includes a pair of ear-engaging members, in this example a pair of ear protectors 29. The ear protectors include earmuffs 32 and 33 for protecting a wearer's ears. Each earmuff is substantially the same in parts and functions and therefore only earmuff 33 will be described in detail. As seen in FIG. 3, earmuff 33 has a top 34 facing top 22 of the assembly 20. Each earmuff has a pair of spaced-apart inner sides and outer sides aligning with the respective sides of the assembly. This is shown by inner side 35 and outer side 36 of earmuff 33, with outer side 36 aligning with side 28 of the assembly 20. As seen in FIG. 1, each earmuff 33 comprises a soft cushion 37 in this example at its inner side. The soft cushion is configured to abut and extend around the wearer's ear. Each earmuff has a centrally-disposed recessed portion 38 in this example within which the wearer's ear may be positioned. Cushion 37 extends around the recessed portion. Each earmuff 33 includes a rigid, dome-like shell 39 in this example at its outer side 36. The shell extends around the cushion. Each earmuff 33 has a pair of spaced-apart tubes 40 and 41 as seen in FIGS. 3 and 4. As seen in FIG. 3, the tubes are positioned between sides 35 and 36 of the earmuffs so as to align with the front 30 and the rear 31 of the assembly 20. The tubes 40 and 41 pivotally connect to the shell 39, as seen by pivot 42 for tube 41 in FIG. 1.

The ear protectors 29 include an arcuate member, in this example a u-shaped, resilient headband 44 operatively connecting the earmuffs 32 and 33 together. The headband is shaped to extend over the top of a wearer's head, such as top 45 of head 47 of wearer 49 shown in FIG. 10. The headband has a pair of spaced-apart ends 46 and 48 positioned adjacent to earmuffs 32 and 33, respectively, as seen in FIG. 1. The headband 44 has a curved top 50 in this example positioned adjacent to top 22 of the assembly. Top 50 is spaced-apart from the ends 46 and 48 of the headband. The headband 44 is configured to rest upon a user's head, with top 50 abutting the top of the user's head. Ends 46 and 48 are configured to abut the sides of the user's head and align adjacent to the user's ears. The headband 44 and earmuffs 32 and 33 as described thus far, with theirs parts and functionings, may be conventional and well known to those skilled in the art.

Referring back to FIG. 1, the assembly 20 includes an adjustment mechanism, in this example two pairs of stiff wires that connect headband 44 with earmuffs 32 and 33 and allow the positioning of the earmuffs relative to the headband to be adjusted. This is shown by wires 52 and 54 for earmuff 33 in FIG. 1. The wires are arcuate-shaped and integral with the headband in this example. The respective wires are configured to fit within and slidably engage with respective ones of the tubes 40 and 41 of the earmuffs 32 and 33 to adjust the positioning of the earmuffs.

As seen in FIG. 1, the assembly 20 has an eye-covering member, in this example an eye protector 56 for protecting the user's eyes. The eye protector is operatively connected to and is pivotable relative to the headband 44. The eye protector 56 includes a glasses-type frame 58, thus including rigid side members or elongate sides 62 and 64, and upon which is connected an eye covering which is at least partially transparent, in this example plastic lenses 60. The sides 62 and 64 configured to extend along the sides of the user's head. Distal ends of the sides of the frame 58 pivotally connect to ends 46 and 48 of the headband 44 via pivots, as shown by pivot 66 for end 67 of side 62 of the frame and end 46 of the headband. The ends of the sides of the frames are positioned between wires 52 and 54 in this example.

Figure 2:
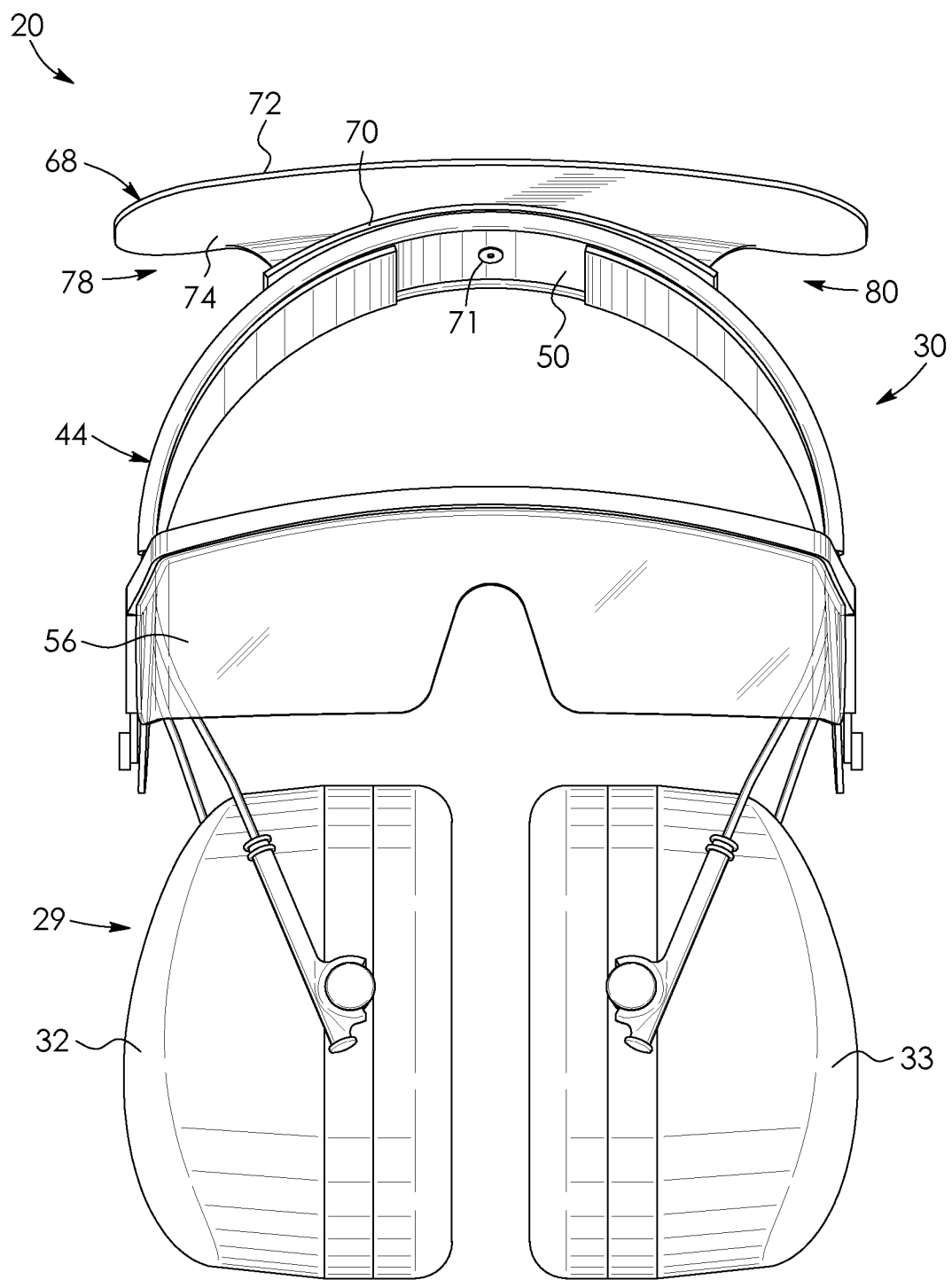
FIG. 2 is a front elevation view of the assembly shown in FIG. 1.

The assembly 20 includes a protective cover 68 connecting to the top 50 of the headband 44 in this example. The ear protectors 29 and protective cover 68 align. The ear protectors 29, protective cover 68 and headband 44 are in the same plane, which is vertically oriented in FIG. 1 and which extends through the ear protectors, protective cover and headband. The protective cover is made of a rigid material in this example, though this is not strictly required. The protective cover 68 is configured to receive, store and protect the eye protector 56. The protective cover is channel-shaped in this example, as shown in FIG. 4. As best seen in FIG. 2, the protective cover 68 has a bottom wall 70 in this example and a top wall 72 spaced-apart from the bottom wall. Each of the walls is arcuate in this example. As seen in FIG. 1, wall 72 has a left side end 77 and a right side end 79 between which the wall extends. The walls 70 and 72 are positioned and spaced-apart for receiving eye protector 56 therebetween when the eye protector is raised, as seen in FIG. 3. Wall 70 has a curvature equal to that of the top of the headband in this example. Also, wall 70 and top 50 of headband 44 have curvatures greater than that of wall 72 in this example.

Referring to FIG. 3, wall 72 has a length L configured to be equal to or longer than the distance between sides 62 and 64 of frame 58 in this example. Bottom wall 70 is connected to top 50 of headband 44 by a connector, in this example by way of a rivet 71. The protective cover 68 has a curved closed rear or back end 74, as best seen in FIGS. 1 and 5, that is generally u-shaped and which connects walls 70 and 72 together. The protective cover has a front opening or open end 76 as seen in FIG. 4 that is spaced-apart from the back end and through which the eye protector 56 passes when raised. As seen in FIG. 4, wall 72 in this example extends at an obtuse angle outwards from back end 74 of the protector towards open end 76. As seen in FIG. 4, the protective cover 68 is angled upwards relative to the bottom wall 70 such that open end 76 of the protective cover is larger than back end 74. Referring to FIGS. 1 and 2, protective cover 68 also has a pair of spaced-apart, side openings 78 and 80 in this example. The side openings of the protective cover 68 extend between walls 70 and 72, with ends 77 and 79 of the wall 72 thus being spaced-apart from and above the pivots 66, thereby at least partially exposing the sides 62 of the eye protector 56 as seen in FIG. 1.

In operation and referring to FIG. 2, the eye protector 56 has a first or lowered position in which the eye protector is angularly spaced-apart from and relative to the headband 44, in this example by 90 degrees. In this position, the eye protector and earmuffs 32 and 33 are configured to align with, engage with and protect the user's eyes and ears. The eye protector 56 is pivotable to a second or raised position, seen in FIGS. 3 to 5, in which the eye protector 56 is disposed within protective cover 68. In this position, as seen in FIG. 3, frame 58 of the eye protector may abut back end 74 of the protective cover. Also in this position, walls 70 and 72 are configured to extend over and protect lenses 60 as seen in FIG. 4. Side openings 78 and 80 of cover 68 align with and receive sides 62 and 64 of frame 58. Thus assembly 20 as herein described enables eye protector 56 to be pivoted upwardly and out of the way when the assembly is not in use. The eye protector 56, including its sides 62 and 64, align with and, in this example, are in parallel with the headband 44, when the eye protector is in the second position. The ear protectors 29, headband 44, eye protector 56 and the protective cover 68 align when the eye protector is in the second position.

When force is directed on eye protector 56 so positioned within cover 68, the exterior, peripheral portions of the cover 68 may withstand and absorb such impact. The eye protector with its cover 68 as herein described may thus inhibit the eye protector from being damaged, scratched and misplaced when the assembly is not in use.

In one embodiment, the protective cover 68 and the headband 44 are integral and in the form of a one-piece moulded unit. In this embodiment, wall 70 of protective cover 68 is not strictly required, as curved top 50 of headband 44 may perform the function of and serve as wall 70.

Figure 6:
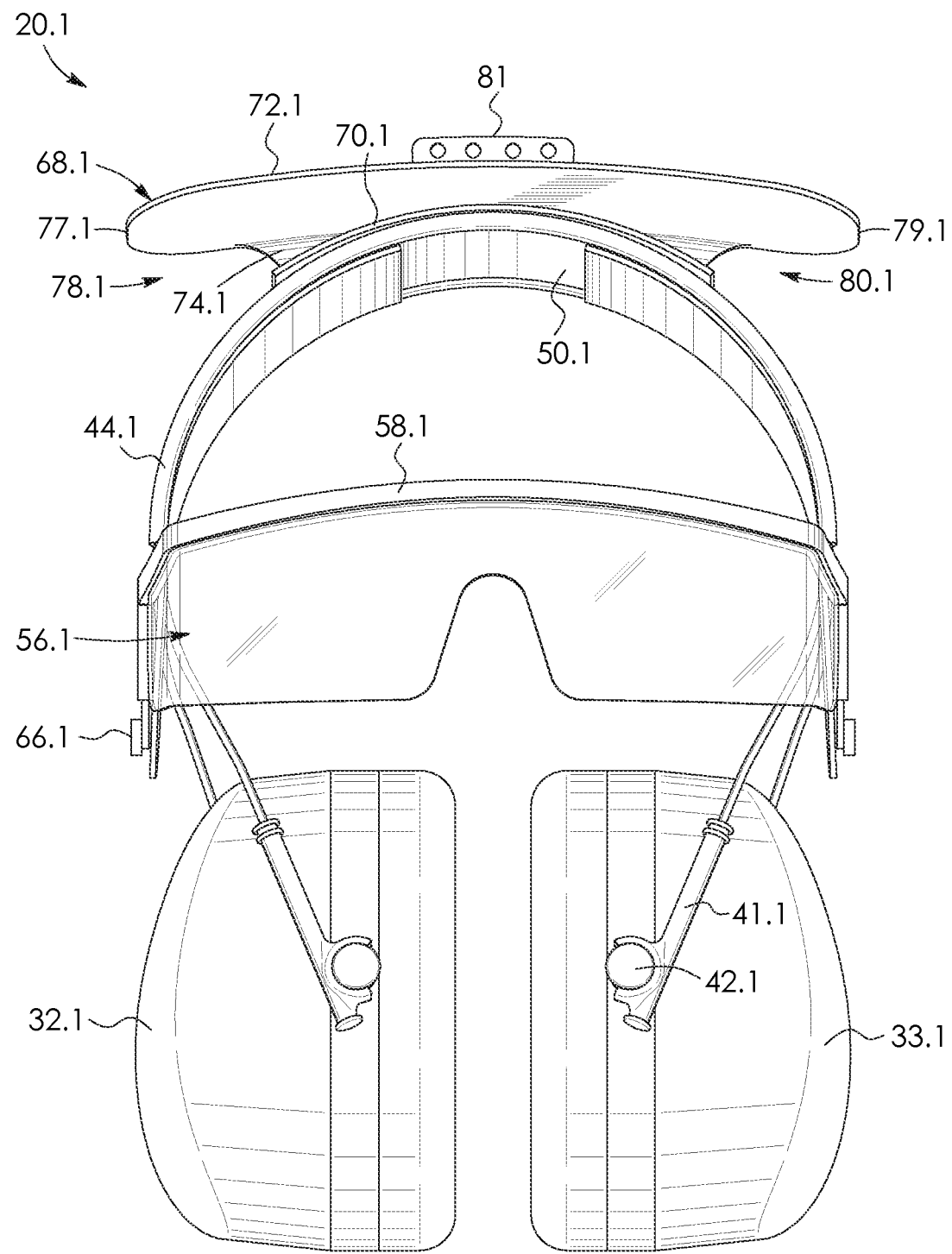
FIG. 6 is a front elevation view of an ear-engaging and eye-covering head assembly according to a second aspect, the assembly having a protective cover, an eye protector in a first position and a light apparatus connected to the protective cover.

FIG. 6 shows an ear and eye protector head assembly 20.1 according to a second aspect. Like parts have like numbers and functions as the assembly shown in FIGS. 1 to 5 with the addition of ".1". Assembly 20.1 is substantially the same as assembly 20 shown in FIGS. 1 to 5 with the following exceptions. The assembly includes a light apparatus, in this example a plurality of lights, in this example light-emitting diode (LED) lights 81 disposed on the top 72.1 of the protective cover 68.1 in this example. There may be a battery pack mounted in or on assembly 20 for the lights. Portable LED lights per se, including their parts and functionings, are well known to those skilled in the art and therefore will not be described in further detail.

Figure 7:
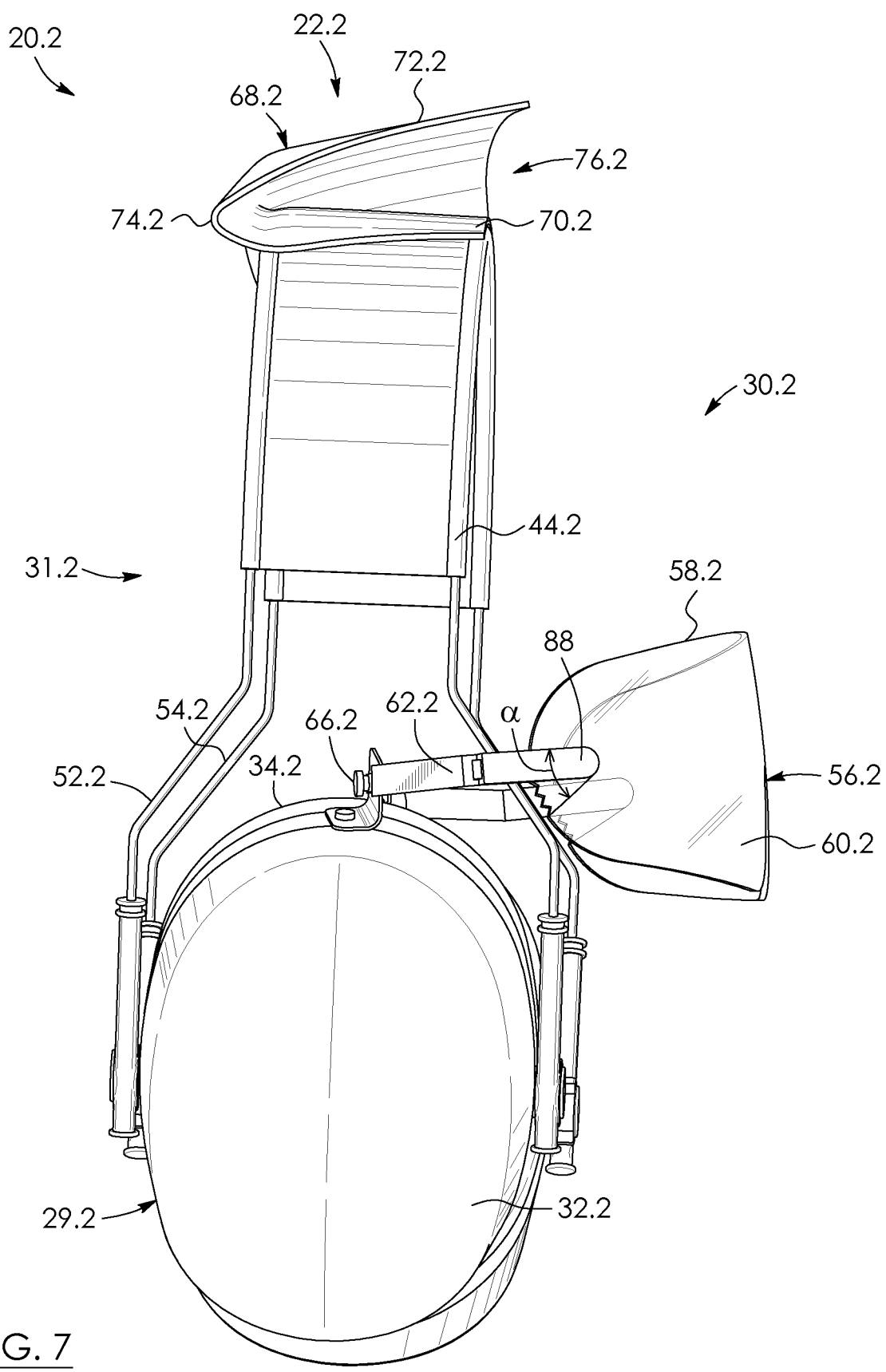
FIG. 7 is a side elevation view of an ear-engaging and eye-covering head assembly according to a third aspect, the assembly having a protective cover and having an eye protector in a first position.
Figure 8:
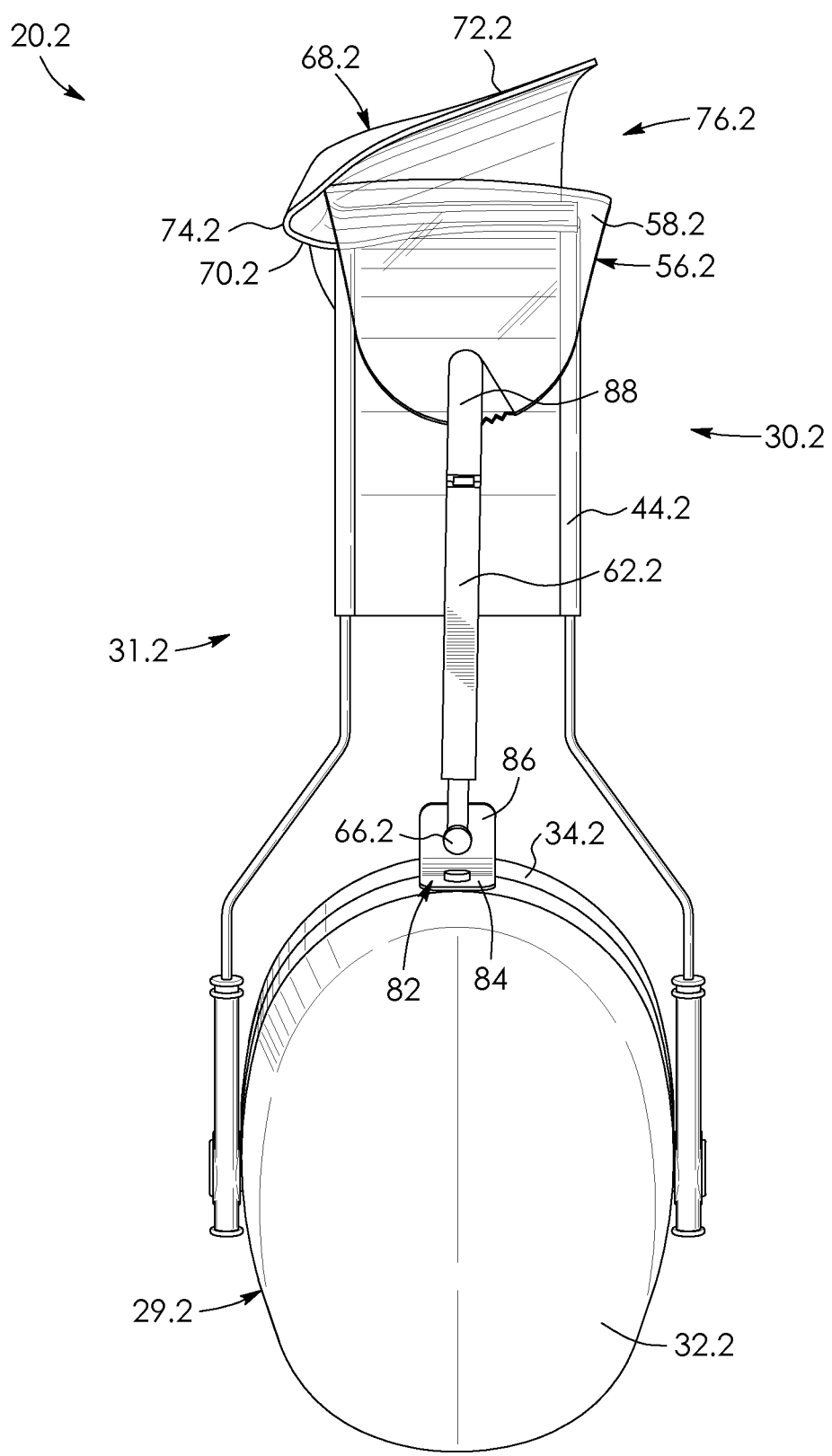
FIG. 8 is a side elevation view of the assembly shown in FIG. 7, the eye protector being positioned within the protective cover in a second position.
Figure 9:
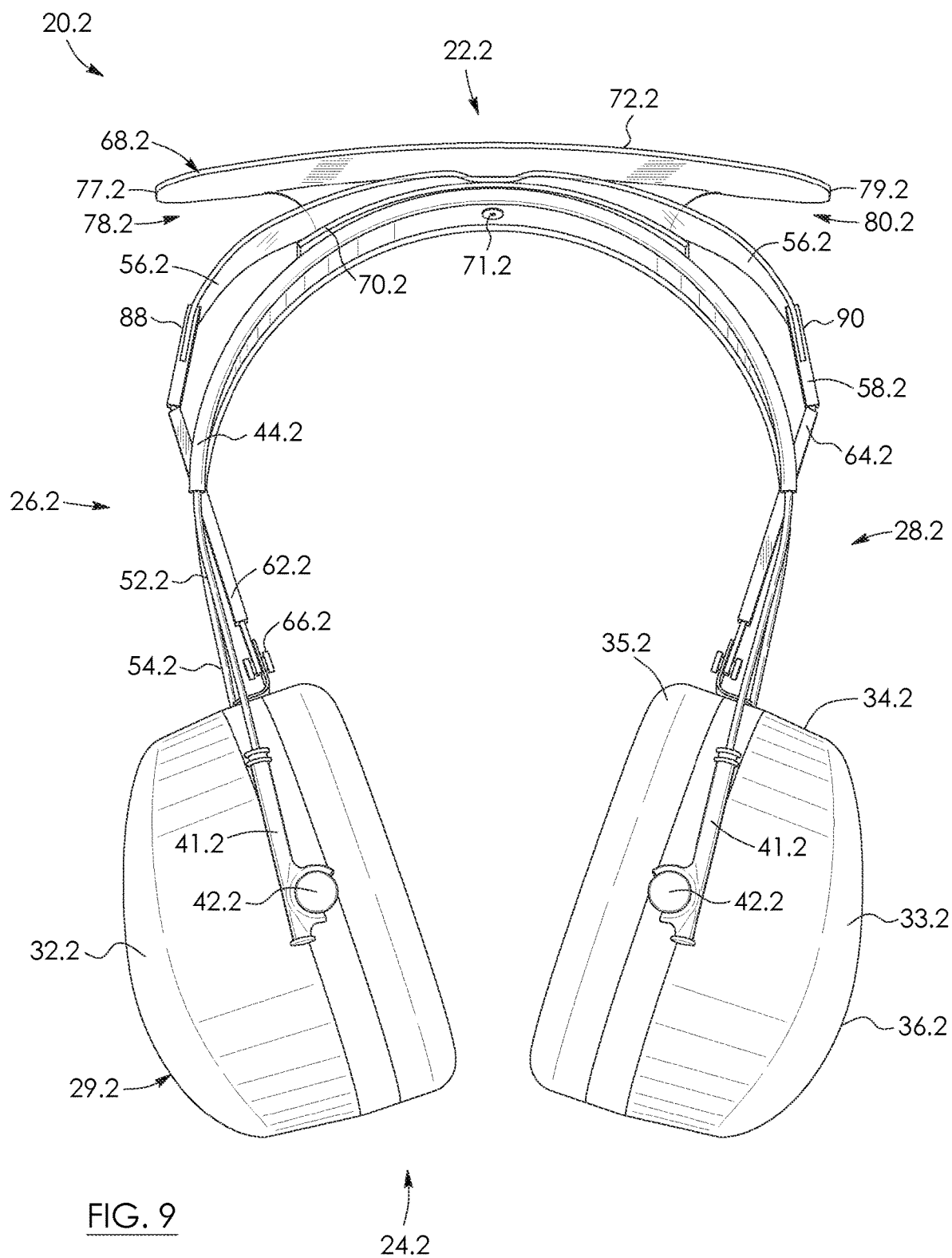
FIG. 9 is a front elevation view of the assembly shown in FIG. 8.

FIGS. 7 to 9 show an ear and eye protector head assembly 20.2 according to a third aspect. Like parts have like numbers and functions as the assembly shown in FIGS. 1 to 5 with the addition of ".2". Assembly 20.2 is substantially the same as assembly 20 shown in FIGS. 1 to 5 with the following exceptions. The assembly includes a pair of connectors, in this example L-shaped brackets connected to the tops 34.2 of the earmuffs 32.2 and 33.2, as shown by bracket 82 for earmuff 32.2. Referring to FIG. 8, each of the brackets has a first portion that connects to its respective earmuff and a second portion angled at 90 degrees relative to the first portion in this example, as shown by first portion 84 and second portion 86 for bracket 82. The second portions 86 of the brackets 82 pivotally connect to the sides 62.2 and 64.2 of the eye protector 56.2, respectively.

As seen in FIG. 7, protective cover 68.2 is v-shaped in cross-section in this example.

As seen in FIGS. 7 and 9, eye protector 56.2 has a pair of adjustment mechanisms, in this example pivots 88 and 90 that pivotally connect plastic lenses 60.2 to sides 62.2 and 64.2. The pivots allow the plastic lenses to be selectively angularly adjusted within an angular span a relative to frame 58.2, as best seen in FIG. 7, with different locking configurations that operate through friction in their pivot 88 and 90 in this example. Eye protectors having such an adjustment mechanism per se, including their parts and functionings, are well known to those skilled in the art and therefore will be described in further detail.

Figure 10:
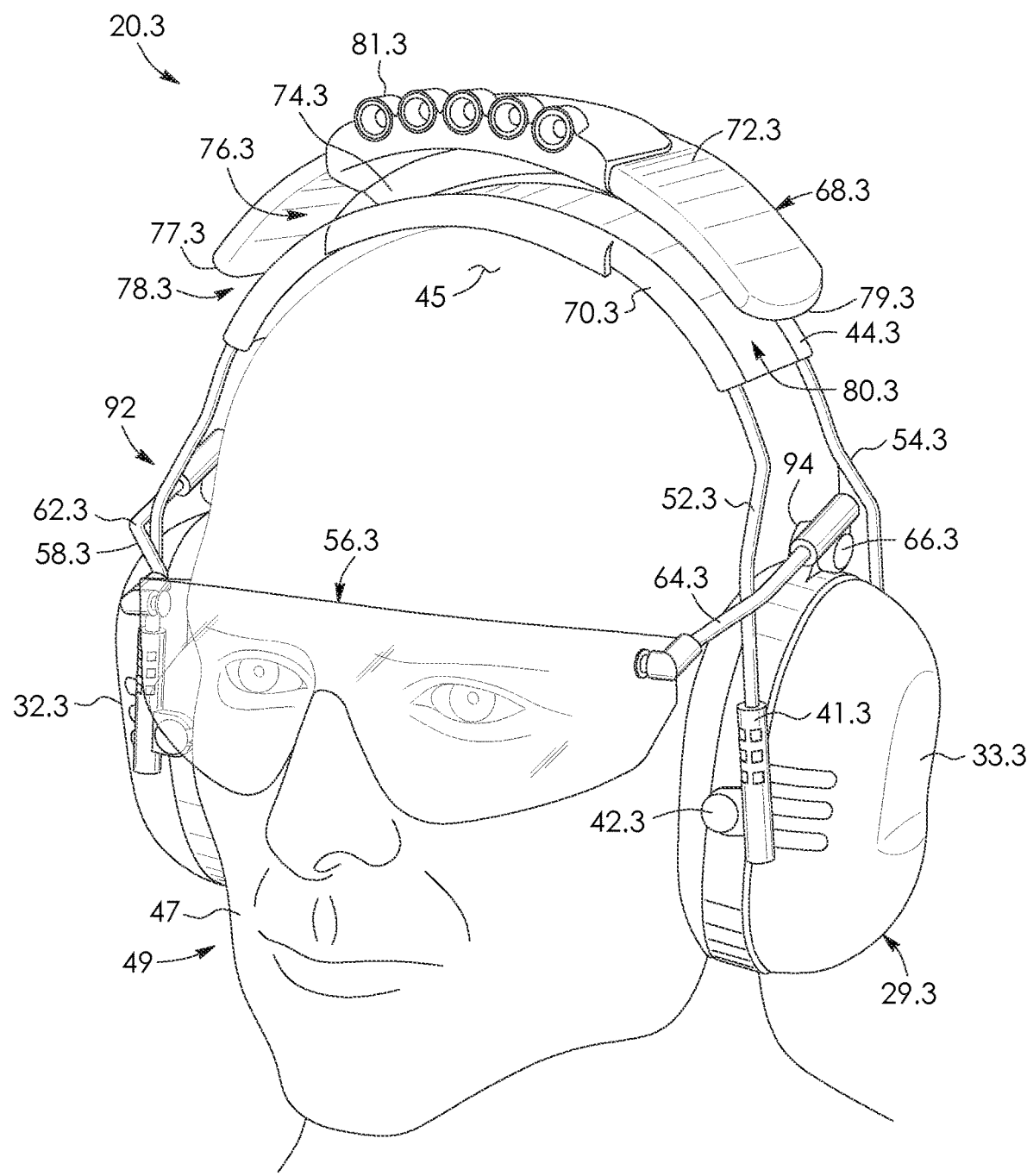
FIG. 10 is a front perspective view of an ear-engaging and eye-covering head assembly according to a fourth aspect.

FIG. 10 shows an ear and eye protector head assembly 20.3 according to a fourth aspect. Like parts have like numbers and functions as the assembly shown in FIGS. 1 to 5 with the addition of decimal extension "0.3". Assembly 20.3 is substantially the same as assembly 20 shown in FIGS. 1 to 5 with some exceptions. Also, lights 81.3 are similar to lights 81 shown in FIG. 6. The lights 81.3 together with the protective cover 68.3 and headband 44.3 are integrally formed as a single part in this example. The curvatures of walls 70.3 and 72.3 of protective cover 68.3 are substantially equal to each other in this example.

Assembly 20.3 includes a further pair of adjustment mechanisms, in this example pivoting tubes 92 and 94 that connect to and extend from respective pivots 66.3. Sides 62.3 and 64.3 of frame 58.3 of the eye protector 56.3 are in the form of wires partially disposed within the tubes 92 and 94. The tubes allow the eye protector to selectively retract inwards or extend outwards relative to headband 44.3. Positioning of the eye protector relative to the wearer's face thereby may be selectively adjusted.

Alternatively, the sides of the frames of the eye protector may be in tube form and slidably engage with elongate members, such as wires, that pivotally connect to and extend from respective ends of the earmuffs and/or headband. In the example shown in FIG. 10, sides 62.3 and 64.3 pivotally connect to earmuffs 32.3 and 33.3.

In a further alternative, the sides of the frame may pivotally connect to the headband in a manner otherwise substantially similar to that shown for assembly 20 in FIGS. 1 to 5.

The assembly as herein described may be useful for protecting a user's eyes and ears in a wide variety of applications. For example, the assembly may be useful for homeowners when mowing the lawn, string trimming weeds, leaf blowing, power washing, splitting wood, chainsawing and landscaping. The assembly may also be useful in the construction industry, for carpentry work with power tools, finishing carpenters, cabinet makers, framers, brush trimming, cutting and setting tiles, stone masons, brick layers, and wood floor installers, for example. The assembly may further be useful in the automotive and aviation industries, for military applications, for fire and police departments, for heavy equipment operators and when using loud machines generally. It may be yet further useful for protecting a user's eyes and ears during recreational and sports activities, such as gaming, car racing, hunting, and shooting, including for shooting ranges. The eye protector may be in the form of sunglasses or prescription eyeglasses.

Figure 11:
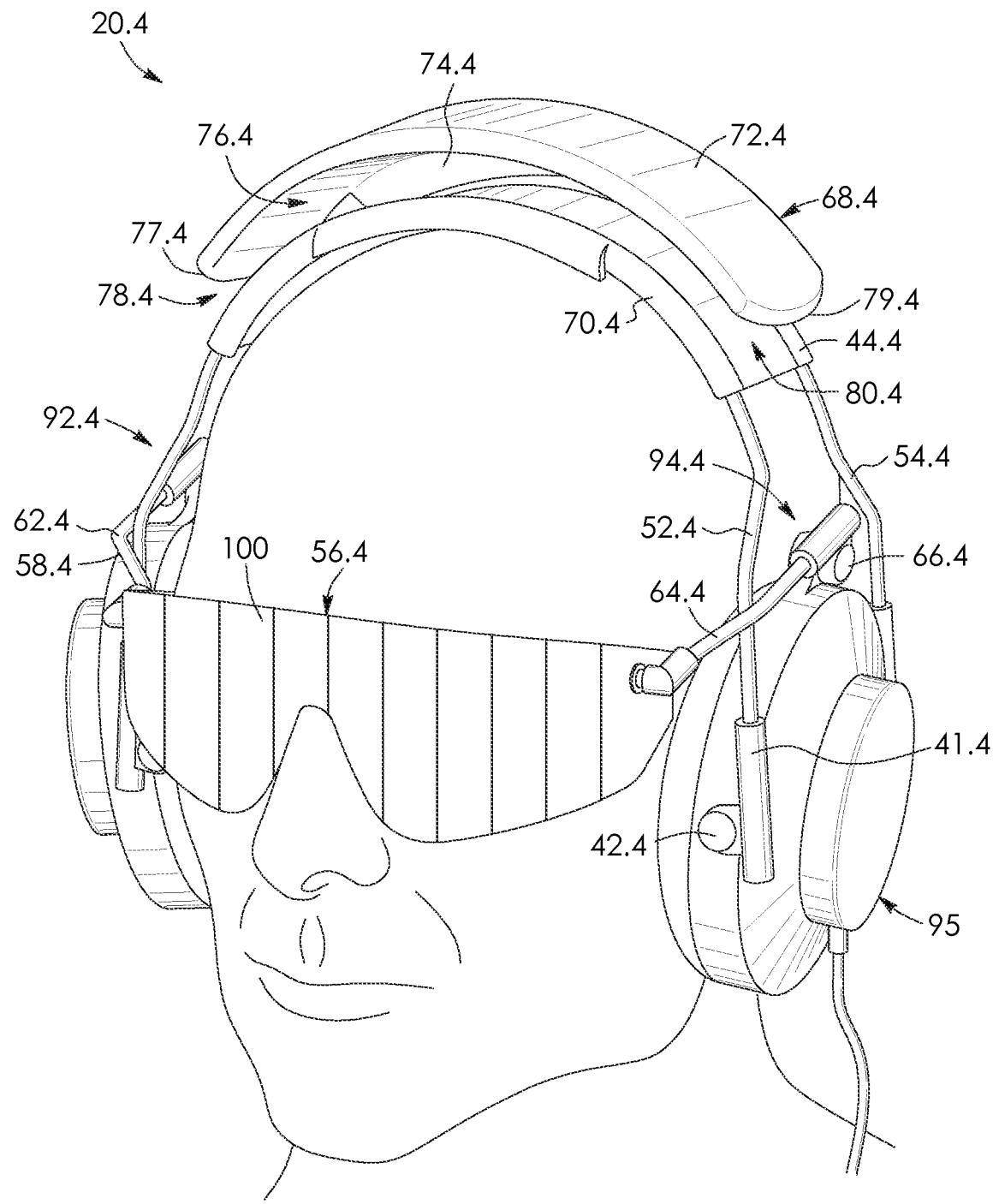
FIG. 11 a front perspective view of an ear-engaging and eye-covering head assembly according to a fifth aspect.

FIG. 11 shows an ear and eye covering head assembly 20.4 according to a fifth aspect. Like parts have like numbers and functions as the assembly shown in FIG. 10 with decimal extension ".4" replacing ".3" and decimal extensions ".4" being added to numerals not previously having decimal extensions. Assembly 20.4 is substantially the same as assembly 20.3 shown in FIG. 10 with the following exceptions. Instead of ear muffs 32.4 and 33.4, the ear-engaging members are headphones 95. Also, the assembly's eye-covering member 56.4 includes a video display assembly 100. The video display assembly may be for use as a virtual reality visor or a display unit, for example. The assembly 100 may be used in the form of a portable movie player, a gaming system and/or portable home stereo system. Earphones and video display assemblies per se are well known to those skilled in the art and therefore will not be described in further detail.

Figure 13:
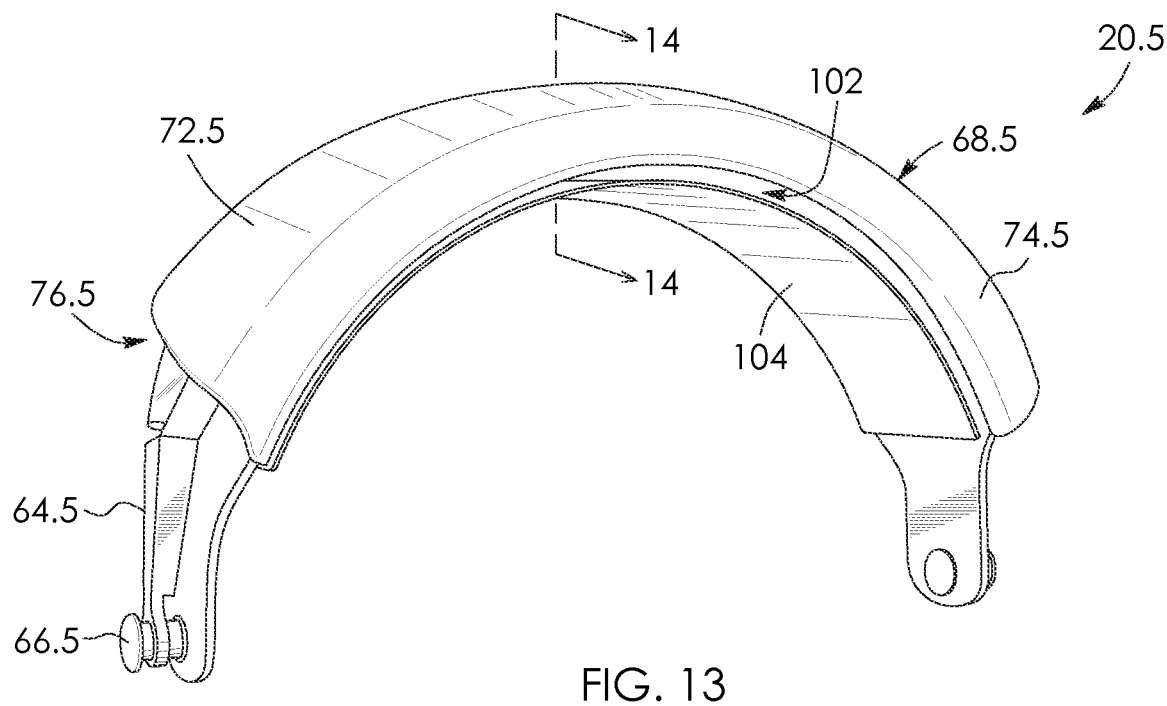
FIG. 13 is a rear perspective view of the protective cover of FIG. 12.
Figure 14:
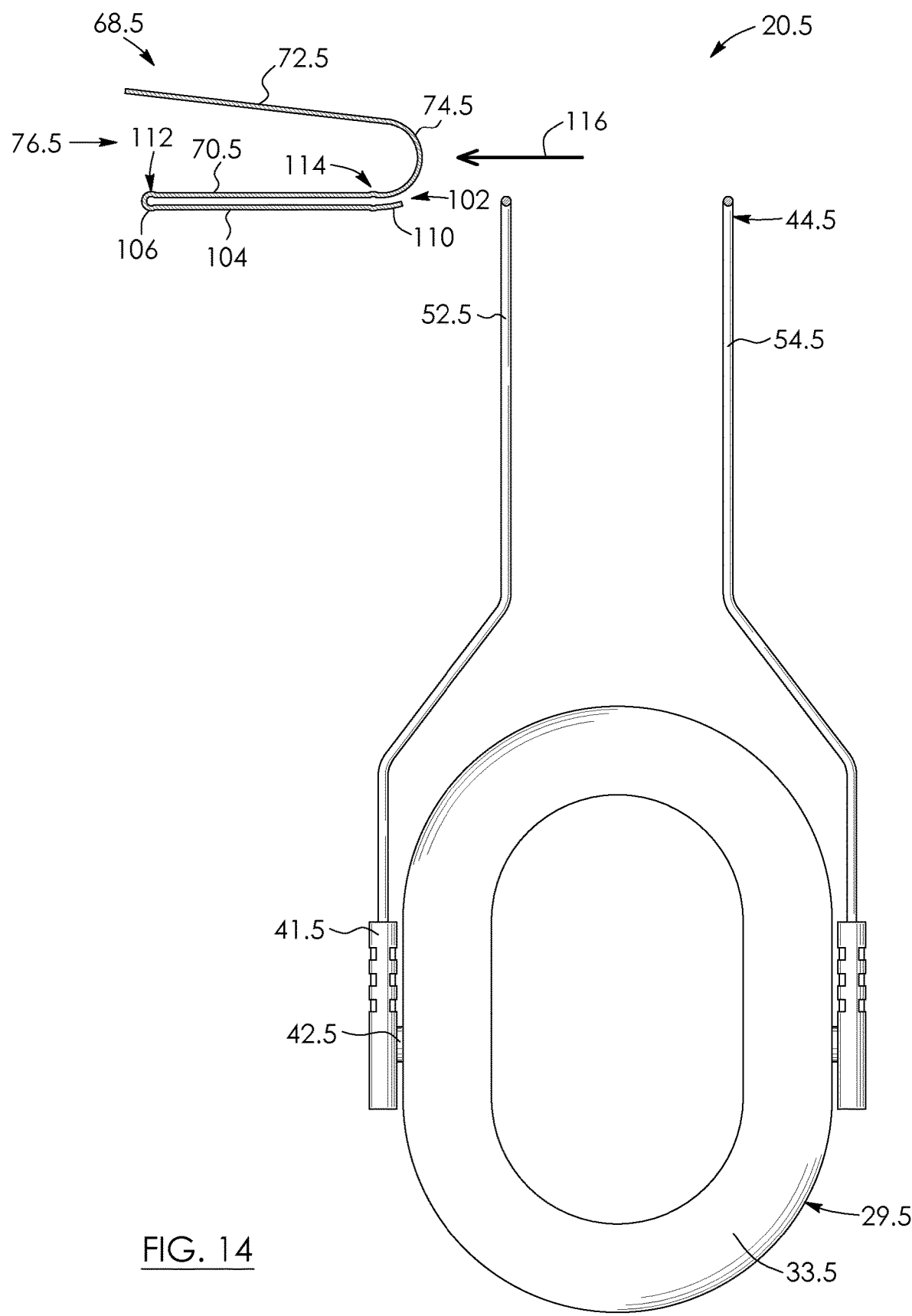
FIG. 14 is a side elevation view of the ear-engaging and eye-covering assembly according to the sixth aspect, the protective cover being shown in section and in the process of connecting to the rest of the assembly.
Figure 15:
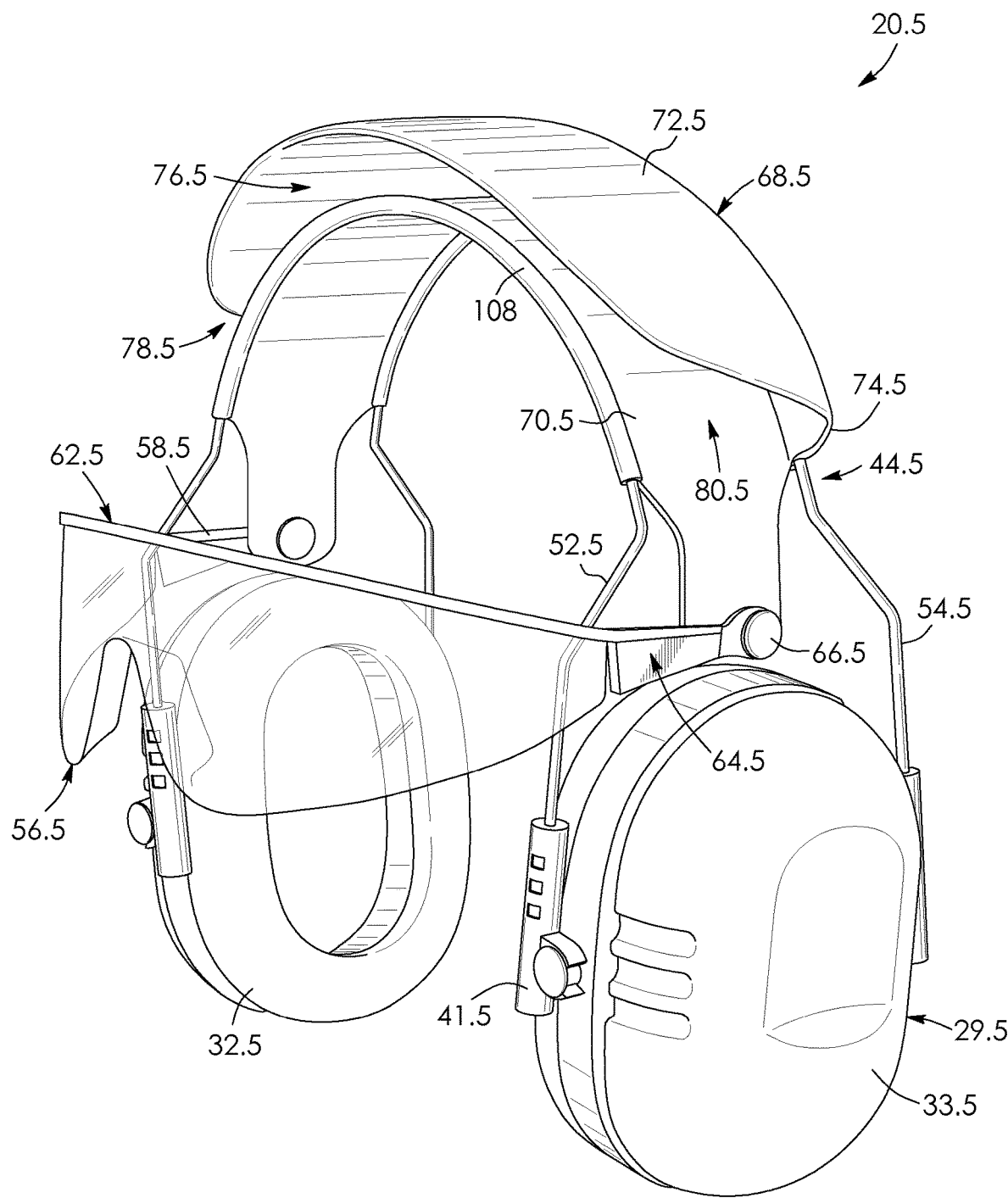
FIG. 15 is a front perspective view of the ear-engaging and eye-covering head assembly according to the sixth aspect, the protective cover being shown connected to the rest of the assembly.

FIGS. 12 to 15 show an ear and eye covering head assembly 20.5 according to a sixth aspect. Like parts have like numbers and functions as the assembly shown in FIG. 6 with decimal extension ".5" replacing ".1" and decimal extensions ".5" being added to numerals not previously having decimal extensions. Assembly 20.5 is similar to assembly 20.1 shown in FIG. 10 with the following exceptions. The assembly includes a protective cover 68.5 that may selectively slip on to and off of the headband of an existing, off-the-shelf pair of ear-engaging members such as earmuffs 32.5 and 33.5. The headband comprises a pair of wires 52.5 and 54.5 as shown in FIG. 15 that connect the earmuffs together.

Figure 12:
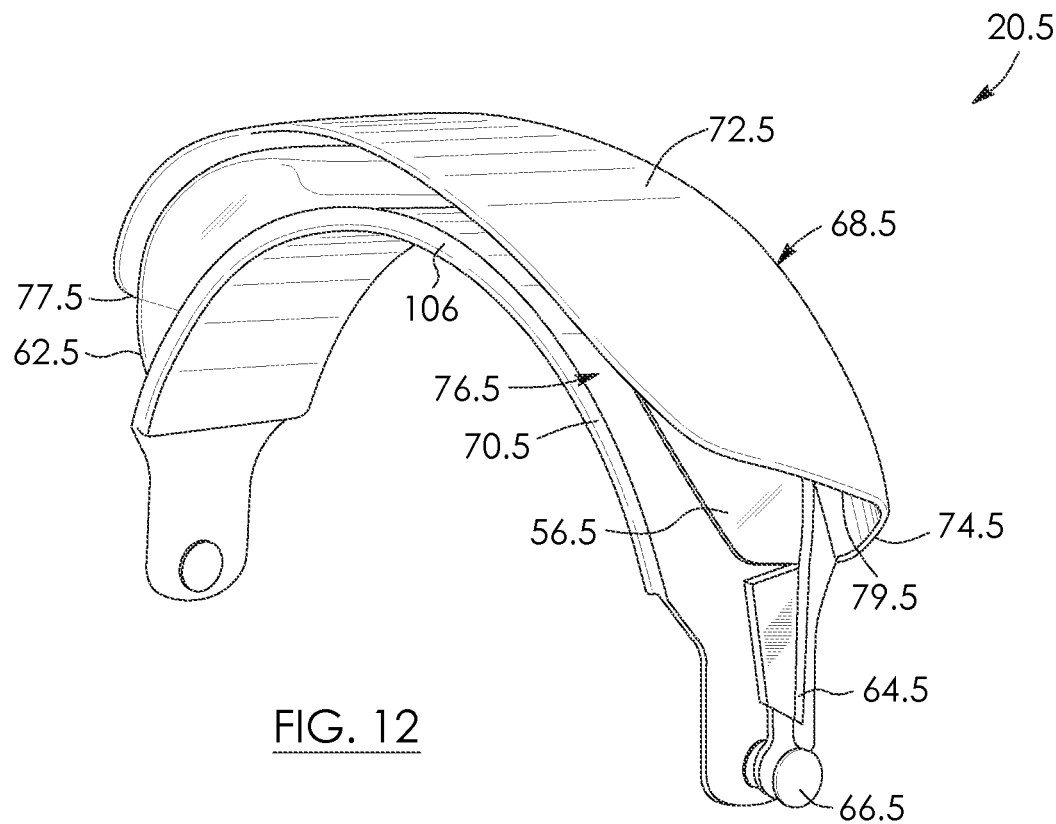
FIG. 12 is a front perspective view of a protective cover for an ear-engaging and eye-covering head assembly according to a sixth aspect.

As seen in FIG. 14, eye protector 68.5 is s-shaped in side cross-section and includes an arcuate-shaped slotted portion 102 formed between a pair of spaced-apart arcuate-shaped walls 70.5 and 104 which are connected together at a first, closed end 106. Referring to FIG. 12, end 106 is arcuate-shaped and aligns with open end 76.5 of the eye protector 68.5 in this example. As seen in FIG. 14, closed rear 74.5 is arc-shaped in side cross-section and wall 104 extends from end 106 to a second end 110 spaced-apart from end 106 and, as seen in FIGS. 12 and 13, is inwardly positioned relative to walls 72.5 and 70.5. End 110 is adjacent to the back end 74.5 of the protector 68.5 in this example.

The eye protector 68.5 has a pair of spaced-apart arcuate-shaped recessed portions 112 and 114 aligned by ends 106 and 110, respectively. Slotted portion 102 is configured to receive headband 44.5, as shown by arrow of numeral 116, with recessed portions 112 and 114 configured to selectively receive wires 52.5 and 54.5, respectively. The eye protector 68.5 may be slid onto the wires of an off-the-shelf headband thereby. Wall 104 may be lowered downwards and spaced-apart from wall 70.5 to selectively from the wires from the eye protector in order to remove the eye protector from the headband.

Figure 16:
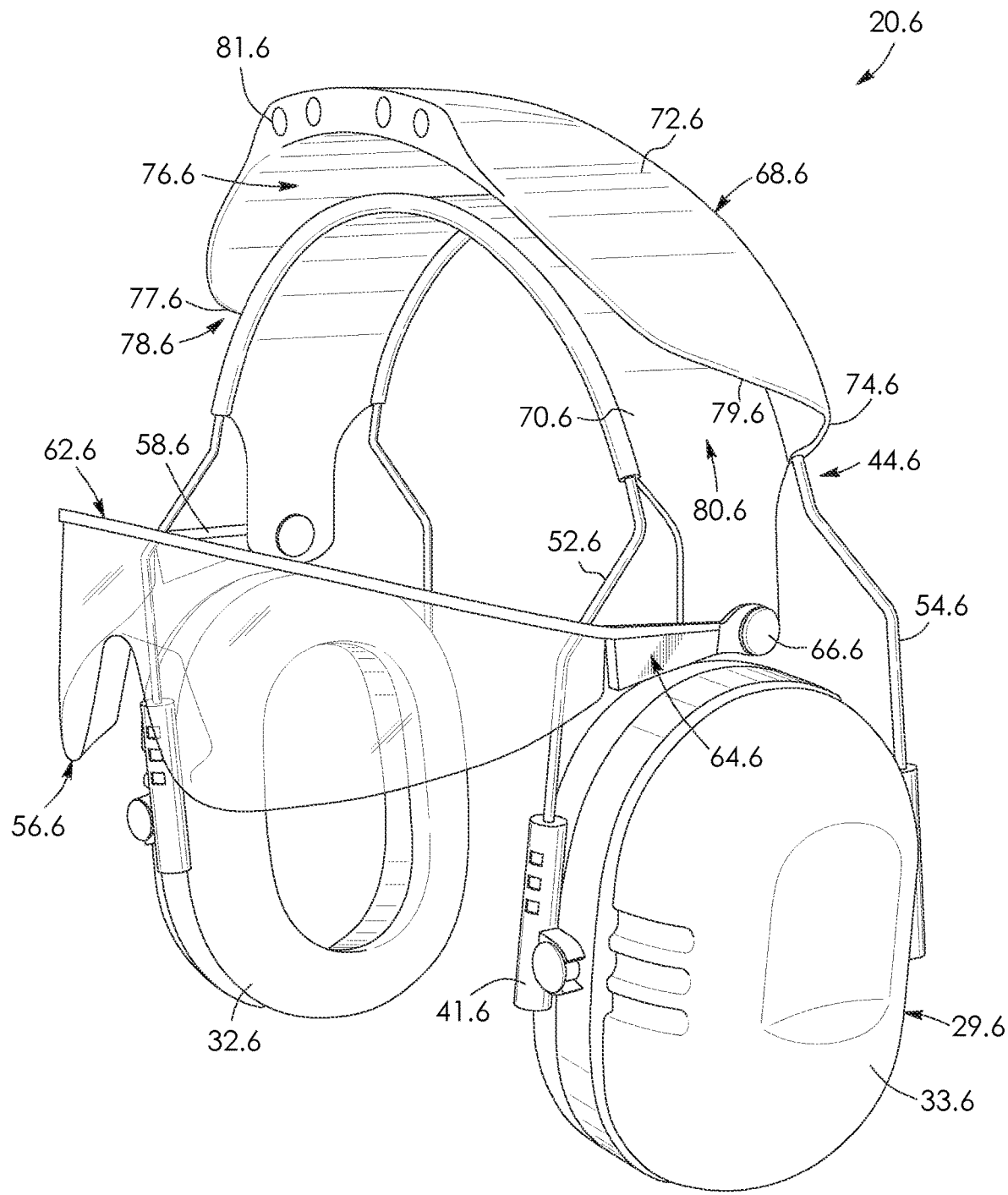
FIG. 16 is a front perspective view of the ear-engaging and eye-covering head assembly according to the seventh aspect.

FIG. 16 shows an ear and eye covering head assembly 20.6 according to a seventh aspect. Like parts have like numbers and functions as the assembly shown in FIGS. 12 to 15 with decimal extension ".6" replacing ".5". Assembly 20.6 is similar to assembly 20.5 shown in FIGS. 12 to 15 with the exception that it includes lights 81.6 substantially the same as lights 81 shown in FIG. 6 for assembly 20.1, the lights being integrally formed with the top wall 72.6 of the eye protector 68.6.

Figure 17:
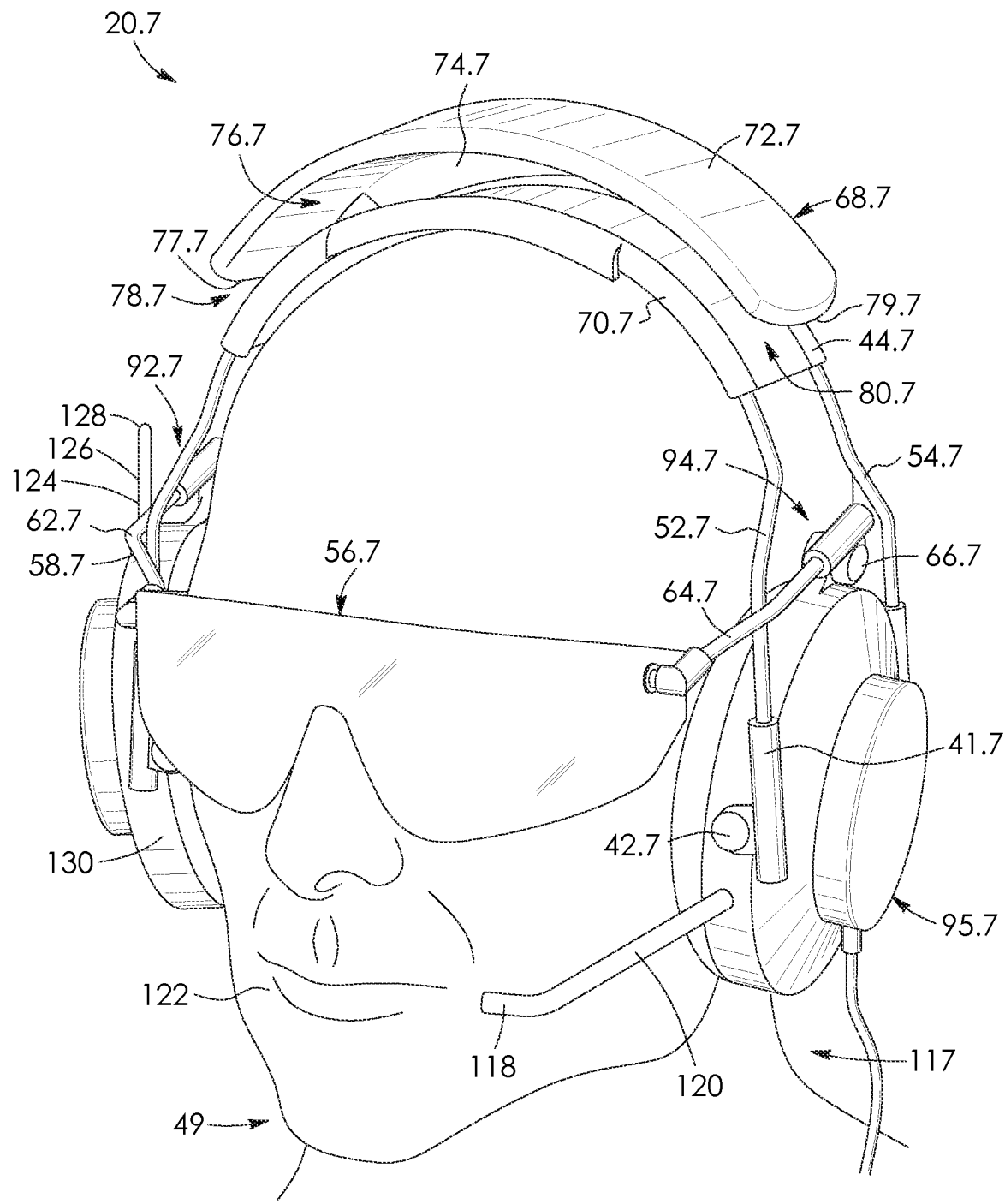
FIG. 17 is a front perspective view of an ear-engaging and eye-covering head assembly according to an eight aspect.

FIG. 17 shows an ear and eye covering head assembly 20.7 according to an eighth aspect. Like parts have like numbers and functions as the assembly shown in FIG. 11 with decimal extension ".7" replacing ".4" and decimal extensions ".7" being added to numerals not previously having decimal extensions. Assembly 20.7 is substantially the same as assembly 20.4 shown in FIG. 11 with the following exceptions. The assembly includes a communication system 117. The communication system has a microphone 118 that connects to and extends from the headphone 95.7 via an elongated rod 120 in this example. The microphone is positioned adjacent to the wearer's mouth 122 and receives voice communications from the wearer 49 of the assembly 20.7. The communication system 117 includes a transmitter 124 for transmitting a signal based on the communications received by the microphone 118. The system includes a receiver 126 for receiving an audio signal transmitted from an external source. Instead of a transmitter and a receiver, a transceiver may be provided. The system 117 includes an antenna 128 connected to and extending outwards from one of the headphones 95.7 in this example. The communication system 117 includes speakers 130 which are a part of the headphones 95.7, respectively. The transmitter 124, receiver 126 and antenna 128 are operatively connected to the microphone 118 and the speakers 130. The communication system in this example is conventional and its parts and functionings will therefore not be described in further detail.

Assembly 20.7 includes headphones 95.7. In the alternative, assembly 20.7 may include ear protectors 29 having earmuffs 32 and 33 such as those shown for assembly 20 in FIGS. 1 to 5.

It will be appreciated that still more variations are possible within the scope of the invention described herein. The light apparatus shown in FIG. 6 may be connected to other parts of the assembly. For example, the lights may connect to the top or sides of frame 58.1 of the eye protector 56.1.

A further adjustment mechanism, similar to that which connects the headband to the earmuffs in FIGS. 1 to 6, may connect the eye protector to the headband. In this instance, pivoting tubes may connect to and extend from the headband and the sides of the frames of the eye protector may be partially disposed within the tubes. Alternatively, the sides of the frames of the eye protector may be in tube form and slidably engage with elongate members, such as wires, that pivotally connect to and extend from respective ends of the headband. Positioning of the eye protector relative to the wearer's face may thereby be selectively adjusted.

It will be understood by someone skilled in the art that many of the details provided above are by way of example only and are not intended to limit the scope of the invention which is to be determined with reference to at least the following claims.

What is claimed is:

1. An ear-engaging and eye-protector head assembly, the assembly having a front, a rear spaced-apart from the front, and a pair of spaced-apart sides, the front and the rear extending between the sides, the assembly comprising:
   a pair of ear-engaging members;
   a headband extending over the top of a wearer's head, the headband having a top and connecting the ear-engaging members together;
   an arcuate-shaped protective cover operatively connected to the top of the headband, the protective cover being made of a rigid material, the protective cover having a pair of side openings aligning with and facing the sides of the assembly, the protective cover including an arcuate-shaped wall spaced-apart above the headband, the wall having spaced-apart left side and right side ends which terminate at the side openings, the left side end and the right side end of the wall being curved, the wall being constant in width between the left side end and the right side end thereof and the headband being approximately constant in width, where width is measured from the front to the rear of the assembly, the protective cover including a closed rear aligning with the rear of the assembly, the closed rear extending between the wall and the headband, the protective cover including a front opening spaced-apart from the closed rear, the front opening aligning with the front of the assembly, the front opening extending between the headband and the wall, the wall angling upwards relative to the headband as the wall extends from the closed rear to the front opening of the protective cover such that the front opening of the protective cover is larger than the closed rear of the protective cover; and
   an eye-protector including a frame having rigid side members pivotally connected to the headband at pivot points, the eye-protector further including an eye-covering connected to the frame, the rigid side members of the frame extending from the pivot points to the eye-covering, the protective cover being shaped to selectively receive the eye-covering via said front opening when the eye-covering is pivoted towards the protective cover, the side openings of the protective cover and the left side end and the right side end of the wall of the protective cover being spaced-apart above the pivot points, thereby exposing the rigid side members of the frame of the eye-protector when the eye-covering is received by the protective cover, the eye-protector having a lowered position in which the eye-protector is angularly spaced-apart from and relative to the headband and the eye-protector having a raised position in which the eye-covering is disposed within the protective cover, whereby gripping one of the rigid side members of the frame enables the eye-protector to be readily movable from the raised position to the lowered position.

2. The assembly as claimed in claim 1 wherein the protective cover extends over the top of the wearer's head and wherein the ear-engaging members and the protective cover extend within a common plane.

3. The assembly as claimed in claim 1 wherein the ear-engaging members are earmuffs.

4. The assembly as claimed in claim 1 further including a light apparatus for selectively emitting light that is disposed on the arcuate-shaped protective cover.

5. The assembly as claimed in claim 1 wherein the closed rear of the protective cover is arc-shaped in side cross-section.

6. The assembly as claimed in claim 1, wherein the protective cover is integrally formed with the headband.

7. The assembly as claimed in claim 1 wherein the assembly further includes a microphone for receiving communications from a wearer of the assembly, and a transmitter for transmitting a signal based on said communications received by the microphone.

8. The assembly as claimed in claim 7, wherein the ear-engaging members include a speaker and wherein the assembly further includes a receiver for receiving a signal transmitted from an external source, the speaker operatively connecting to the receiver.

9. The assembly as claimed in claim 1 wherein the eye-covering includes a video display assembly and wherein the ear-engaging members comprise headphones.

10. The assembly as claimed in claim 1, wherein the assembly has a top extending between the front and the rear thereof and extending between the sides thereof, and wherein the wall of the protective cover extends along and adjacent to the top of the assembly.

11. The assembly as claimed in claim 1, wherein the assembly has a top extending between the front and the rear thereof and extending between the sides thereof, and wherein the left side end and the right side end of the wall of the protective cover are positioned adjacent to the top of the assembly.

12. The assembly as claimed in claim 1 wherein the wall has a length approximately equal to the distance between the rigid side members of the frame of the eye-protector.

13. The assembly as claimed in claim 1, wherein the headband has a curvature greater than that of the wall and wherein the wall generally has the shape of a curved rectangle.

14. The assembly as claimed in claim 1 wherein the protective cover is v-shaped in cross-section.

15. The assembly as claimed in claim 1 wherein the ear-engaging members, the headband and the protective cover are in a common plane which is vertically oriented in use and which extends through the ear-engaging members, the protective cover and the headband.

16. The assembly as claimed in claim 1 wherein the wall is rectangular in top profile.

17. The assembly as claimed in claim 1, wherein the protective cover further comprises a securing portion directly connected to and touching the headband and the closed rear, the front opening extending between the securing portion and the wall.

18. An assembly comprising:
ear protectors including a pair of earmuffs and a headband connecting together the earmuffs;
eye-protectors coupled and pivotable relative to the headband; and
a protective cover coupling to the headband, being rigid, having an open front, being shaped to selectively receive the eye-protectors via the open front, having open sides, and including a wall spaced-apart above the headband, the wall having left side and right side ends which terminate at the open sides of the protective cover, wherein the left side end and the right side end are curved, and wherein the wall is constant in width between the left side end and the right side end thereof and the headband is approximately constant in width, where width is measured from the front to the rear of the assembly,
wherein the ear protectors are fixably attached to the eye-protectors.

19. The assembly as claimed in claim 18, wherein the protective cover is shaped such that the eye-protectors are fully exposed at sides thereof.

20. The assembly as claimed in claim 18, wherein the eye-protectors include a rigid side members pivotally connected to the headband and an eye-covering connected to the rigid side members, and wherein the rigid side members of the eye-protector are fully exposed when the eye-protectors are received within the protective cover.

21. The assembly as claimed in claim 18, wherein the protective cover further comprises a securing portion directly connected to and touching the headband and the closed rear, the front opening extending between the securing portion and the wall.

* * * * *

UNITED STATES PATENT AND TRADEMARK OFFICE
CERTIFICATE OF CORRECTION

Page 1 of 1

PATENT NO. : 10,663,759 B2
APPLICATION NO. : 13/716432
DATED : May 26, 2020
INVENTOR(S) : Vollet It is certified that error appears in the above-identified patent and that said Letters Patent is hereby corrected as shown below:

In the Claims

Claim 20 should read:
20. The assembly as claimed in claim 18, wherein the eye-protectors include rigid side members pivotally connected to the headband and an eye-covering connected to the rigid side members, and wherein the rigid side members of the eye-protector are fully exposed when the eye-protectors are received within the protective cover.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*